United States Patent
Bian et al.

(10) Patent No.: US 10,425,034 B2
(45) Date of Patent: Sep. 24, 2019

(54) MOTOR CONTROLLER AND ELECTRONICALLY COMMUTATED MOTOR COMPRISING THE SAME

(71) Applicant: Zhongshan Broad-Ocean Motor Co., Ltd., Zhongshan (CN)

(72) Inventors: Wenqing Bian, Zhongshan (CN); Di Zhang, Zhongshan (CN)

(73) Assignee: ZHONGSHAN BROAD-OCEAN MOTOR CO., LTD., Zhongshan (CN)

( * ) Notice: Subject to any disclaimer, the term of this patent is extended or adjusted under 35 U.S.C. 154(b) by 0 days.

(21) Appl. No.: 15/866,431

(22) Filed: Jan. 9, 2018

(65) Prior Publication Data

US 2018/0131307 A1 May 10, 2018

Related U.S. Application Data

(63) Continuation-in-part of application No. PCT/CN2016/098490, filed on Sep. 8, 2016.

(30) Foreign Application Priority Data

Apr. 21, 2016 (CN) .................. 2016 2 0340982 U

(51) Int. Cl.
*H02P 27/08* (2006.01)
*H02K 11/20* (2016.01)
(Continued)

(52) U.S. Cl.
CPC .............. *H02P 27/08* (2013.01); *H02K 11/20* (2016.01); *H02M 7/44* (2013.01); *H02P 4/00* (2013.01);
(Continued)

(58) Field of Classification Search
CPC .. H02P 27/08; H02P 6/16; H02P 6/085; H02P 27/04; H02P 6/04; H02P 6/14;
(Continued)

(56) References Cited

U.S. PATENT DOCUMENTS 5,492,273 A * 2/1996 Shah ................. H02P 6/085
236/44 A
5,592,058 A * 1/1997 Archer ............... H02P 6/085
318/400.09

(Continued)

FOREIGN PATENT DOCUMENTS

| CN | 201336646 Y | 10/2009 |
|---|---|---|
| CN | 101814878 A | 8/2010 |
| CN | 104163225 A | 11/2014 |
| JP | 5760934 B2 | 8/2015 |

*Primary Examiner* — Thai T Dinh
(74) *Attorney, Agent, or Firm* — Matthias Scholl P.C.; Matthias Scholl

(57) ABSTRACT

A motor controller, including: a microprocessor including a signal identification unit; an inverter circuit; a rotation speed detection circuit; a power module; and an isolation circuit. The power module supplies power for the microprocessor, the inverter circuit, the rotation speed detection circuit, and the isolation circuit. The isolation circuit is connected to the microprocessor via a pulse width modulation (PWM) input line, and a PWM signal is transmitted to the isolation circuit and the microprocessor successively via the PWM input line. One rotation speed input signal of a motor is transmitted to the signal identification unit of the microprocessor via the isolation circuit and the PWM input line. The signal identification unit determines whether an input signal of the PWM input line is the PWM signal or the one rotation speed input signal of the motor.

13 Claims, 5 Drawing Sheets

(51) Int. Cl.
*H02M 7/44* (2006.01)
*H02P 4/00* (2006.01)
*H02P 6/04* (2016.01)
*H02P 6/14* (2016.01)
*H02P 6/16* (2016.01)
*H02K 11/33* (2016.01)
*G01D 5/14* (2006.01)
*H02M 1/00* (2006.01)

(52) U.S. Cl.
CPC .............. *H02P 6/04* (2013.01); *H02P 6/14* (2013.01); *H02P 6/16* (2013.01); *G01D 5/145* (2013.01); *H02K 11/33* (2016.01); *H02M 2001/0006* (2013.01)

(58) Field of Classification Search
CPC . H02P 4/00; H02M 7/44; H02K 11/20; H02K 11/33
See application file for complete search history.

(56) References Cited

U.S. PATENT DOCUMENTS

| | | | | |
|---|---|---|---|---|
| 6,369,536 | B2* | 4/2002 | Beifus | H02P 6/08 318/400.12 |
| 7,042,180 | B2* | 5/2006 | Terry | F04B 35/04 318/400.21 |
| 7,657,161 | B2* | 2/2010 | Jeung | F04D 27/004 388/806 |
| 2003/0080772 | A1* | 5/2003 | Giacomini | B60R 16/0239 324/765.01 |
| 2009/0224709 | A1* | 9/2009 | Jeung | H02P 6/085 318/400.13 |
| 2010/0052592 | A1* | 3/2010 | Shahi | G05B 19/414 318/558 |
| 2011/0260671 | A1* | 10/2011 | Jeung | H02P 6/08 318/701 |
| 2014/0265957 | A1* | 9/2014 | Hu | H02P 6/08 318/400.15 |
| 2016/0036300 | A1* | 2/2016 | Zhao | H02P 6/08 318/400.21 |

* cited by examiner

MOTOR CONTROLLER AND ELECTRONICALLY COMMUTATED MOTOR COMPRISING THE SAME

CROSS-REFERENCE TO RELATED APPLICATIONS

This application is a continuation-in-part of International Patent Application No. PCT/CN2016/098490 with an international filing date of Sep. 8, 2016, designating the United States, now pending, and further claims foreign priority benefits to Chinese Patent Application No. 201620340982.3 filed Apr. 21, 2016. The contents of all of the aforementioned applications, including any intervening amendments thereto, are incorporated herein by reference. Inquiries from the public to applicants or assignees concerning this document or the related applications should be directed to: Matthias Scholl P. C., Attn.: Dr. Matthias Scholl Esq., 245 First Street, 18th Floor, Cambridge, Mass. 02142.

BACKGROUND OF THE INVENTION

Field of the Invention

The disclosure relates to a motor controller and an electronically commutated motor (ECM) comprising the same.

Description of the Related Art

Conventional ECMs have 5-6 rotation speed input lines for selecting running speeds of the motor, and one pulse width modulation (PWM) input for motor speed regulation. As shown in FIGS. 1-3, the ECM includes a motor body 1 and a motor controller 2. The motor controller 2 includes a rotation speed detection circuit, a power module, a microprocessor, an inverter circuit, and a rotor position detection circuit. Five rotation speed input lines (N1, N2, N3, N4, N5), a common signal line COM, a power line (N, L), a grounding line G, and a PWM input line P0 all lead out of the motor controller 2. The PWM input line P0 can input a PWM signal for motor speed regulation. The motor controller 2 is further connected to a pair of communication connection terminals J1, a pair of steering terminals J2, and a pair of double voltage conversion terminals J3.

Thus, a plurality of lead wires is disposed on the motor controller 2, occupying a relatively large space of the controller contributing to increased costs. In addition, most of the lead wires are connected to a common I/O port of the microprocessor, increasing the burden of the common I/O port and reducing the transmission efficiency.

SUMMARY OF THE INVENTION

In view of the above-described problems, it is one objective of the invention to provide a motor controller and an ECM comprising the same. The motor controller has a relatively low occupancy rate on the common I/O port of the microprocessor, which reduces the cost and improving the transmission efficiency.

To achieve the above objectives, in accordance with one embodiment of the invention, there is provided a motor controller, comprising: a microprocessor comprising a signal identification unit; an inverter circuit; a rotation speed detection circuit; a power module; and an isolation circuit. The power module supplies power for the microprocessor, the inverter circuit, the rotation speed detection circuit, and the isolation circuit. The isolation circuit is connected to the microprocessor via a pulse width modulation (PWM) input line, and a PWM signal is transmitted to the isolation circuit and the microprocessor successively via the PWM input line. One rotation speed input signal of a motor is transmitted to the signal identification unit of the microprocessor via the isolation circuit and the PWM input line. The signal identification unit determines whether an input signal of the PWM input line is the PWM signal or the one rotation speed input signal of the motor.

In a class of this embodiment, the one rotation speed input signal of the motor is a 24 VAC signal, a 115 VAC signal, or a 230 VAC signal.

In a class of this embodiment, the PWM input line is connected to a multiplexing I/O port of a timer of the microprocessor.

In a class of this embodiment, remaining rotation speed input signals of the motor are input via corresponding rotation speed input lines; the remaining rotation speed input lines are connected to the rotation speed detection circuit; the rotation speed detection circuit transmits the rotation speed input signals to a common I/O port of the microprocessor; the microprocessor selects an operating parameter of the motor according to the rotation speed input signals from the rotation speed input lines and the one rotation speed input signal from the PWM input line, and controls the motor to run according to the selected operating parameter.

In a class of this embodiment, the signal identification unit is a hardware unit which employs a spectrum identifier; when a frequency of the input signal of the PWM signal input line is 50 Hz or 60 Hz, determine the input signal is the one rotation speed input signal of the motor; and when a frequency of the input signal of the PWM signal input line is unequal to 50 Hz or 60 Hz, determine the input signal is the PWM signal.

In a class of this embodiment, the signal identification unit is a software unit; when a frequency of the input signal of the PWM signal input line is 50 Hz or 60 Hz, determine the input signal is the one rotation speed input signal of the motor; and when a frequency of the input signal of the PWM signal input line is unequal to 50 Hz or 60 Hz, determine the input signal is the PWM signal.

In a class of this embodiment, the isolation circuit is an optocoupler isolation circuit.

In another aspect, the disclosure provides an electronically commutated motor (ECM), which comprises the abovementioned motor controller and a motor body. The motor body comprises a rotor assembly, a stator assembly, and a housing assembly.

Advantages of the motor controller and the ECM comprising the same of the disclosure are summarized as follows:

1. One rotation speed input signal of a motor is transmitted to the signal identification unit of the microprocessor via the isolation circuit and the PWM input line, and the signal identification unit determines whether an input signal of the PWM input line is a PWM signal or a rotation speed input signal of the motor. Thus, the microprocessor is fully utilized, reducing the occupancy rate of the I/O ports by the rotation speed input lines, simplifying the structure of the controller (one external lead wire is omitted), and saving the production costs.

2. The isolation circuit is an optocoupler isolation circuit, and the rotation speed input signal of the motor is a 24 VAC signal, a 115 VAC signal, or a 230 VAC signal, leading to a wide application scope.

3. The signal identification unit is a hardware unit, for example, a spectrum identifier, or a software unit, both are easily available.

BRIEF DESCRIPTION OF THE DRAWINGS

The invention is described hereinbelow with reference to the accompanying drawings, in which.

DETAILED DESCRIPTION OF THE EMBODIMENTS

For further illustrating the invention, experiments detailing a motor controller are described below.

Example 1

Figure 1:
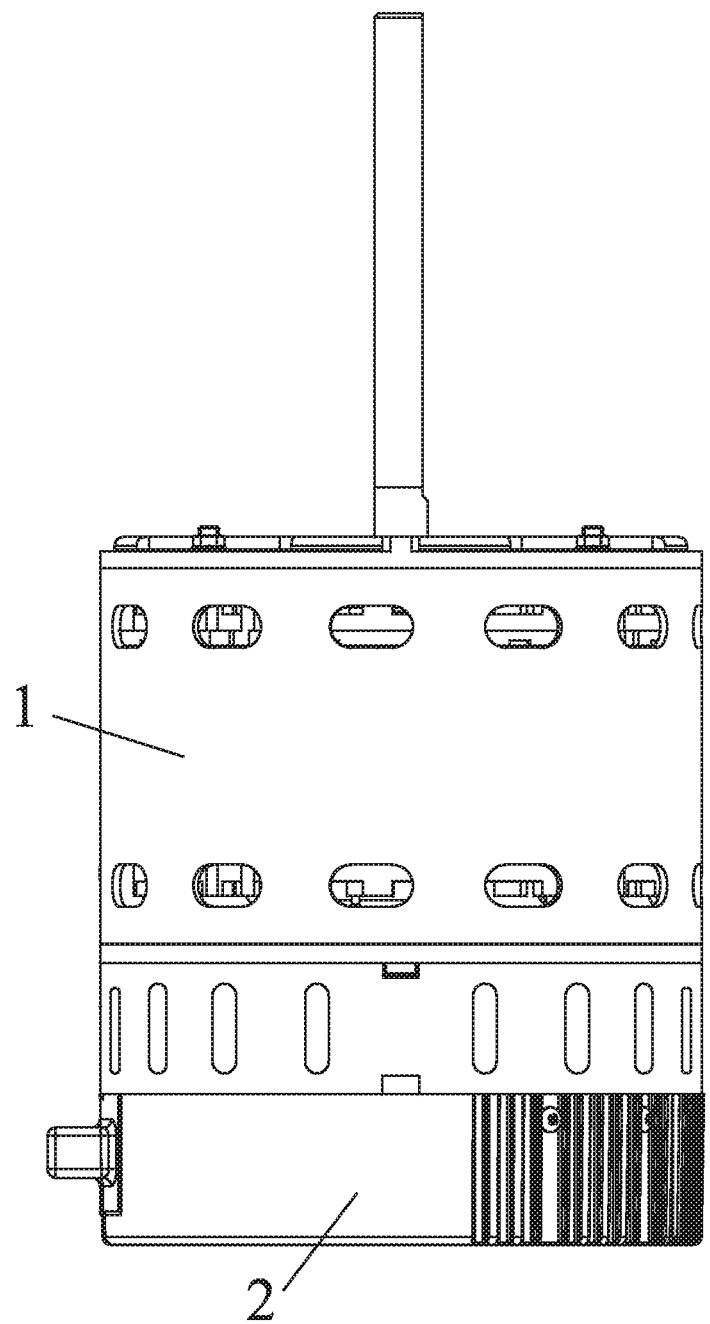
FIG. 1 is a schematic diagram of an ECM in the prior art.
Figure 2:
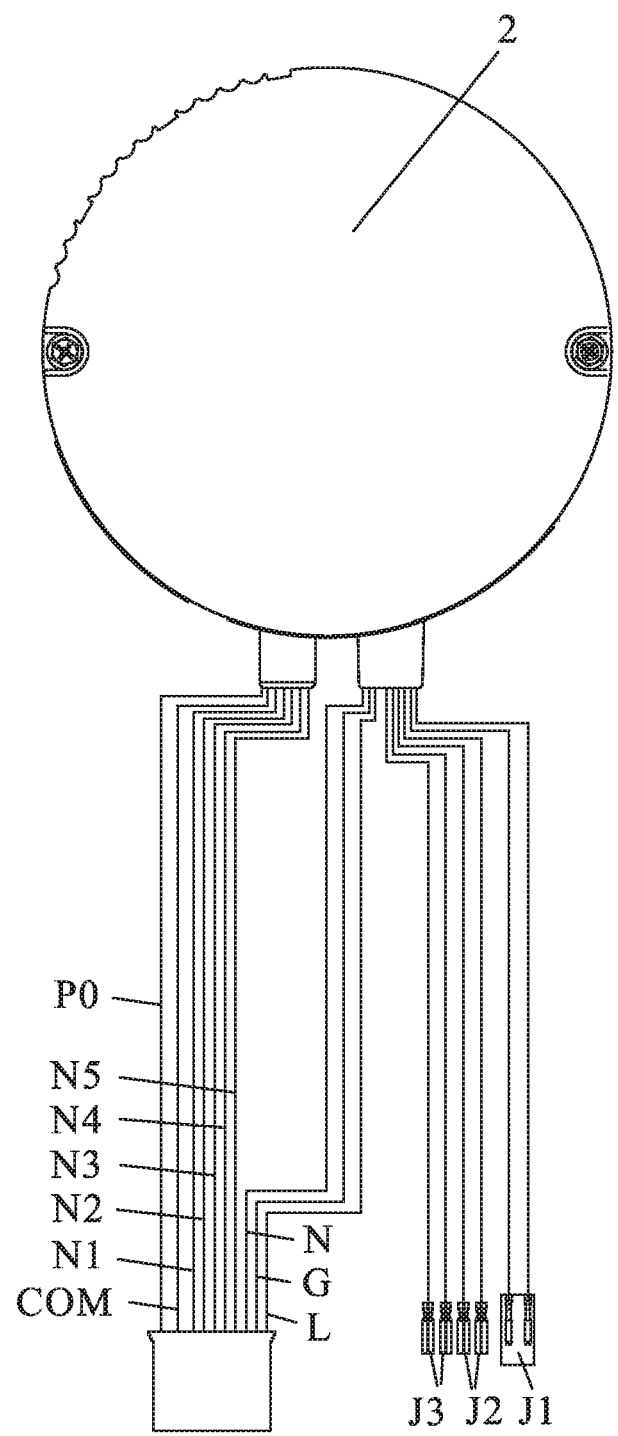
FIG. 2 is a schematic diagram of lead wires of an ECM in the prior art.
Figure 3:
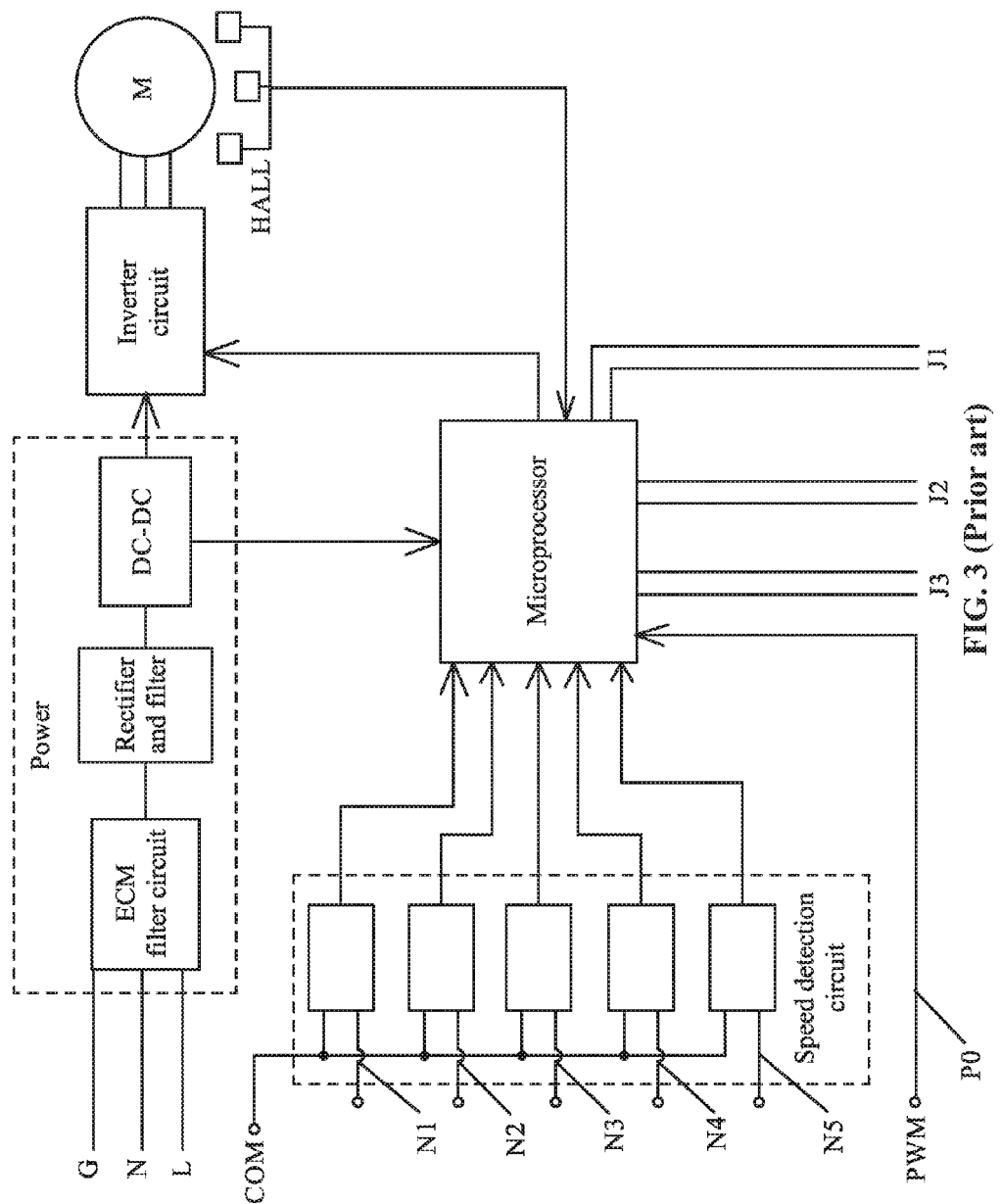
FIG. 3 is a circuit block diagram of a motor controller of an ECM in the prior art.
Figure 4:
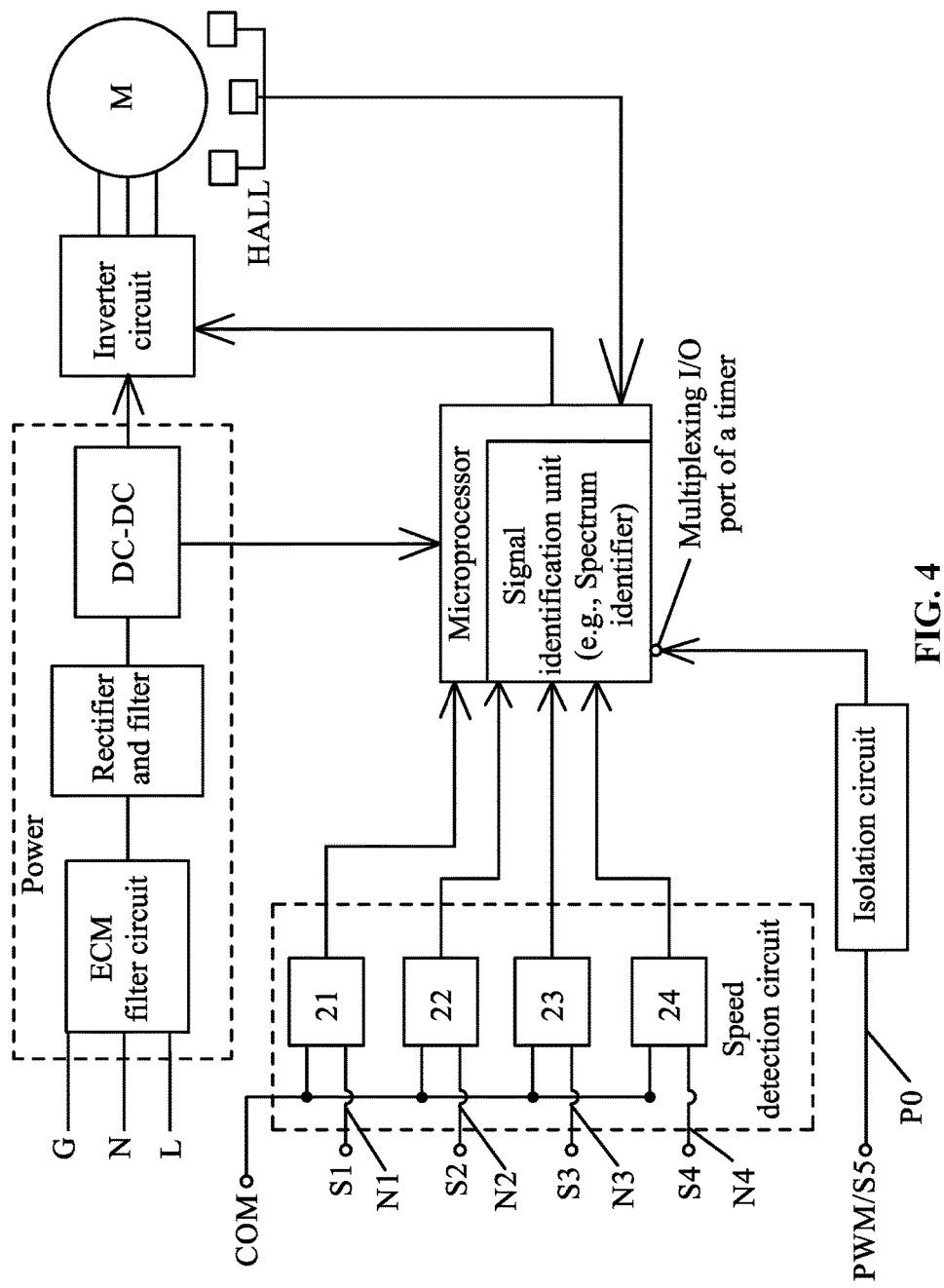
FIG. 4 is a circuit block diagram of a motor controller according to one embodiment of the disclosure.
Figure 5:
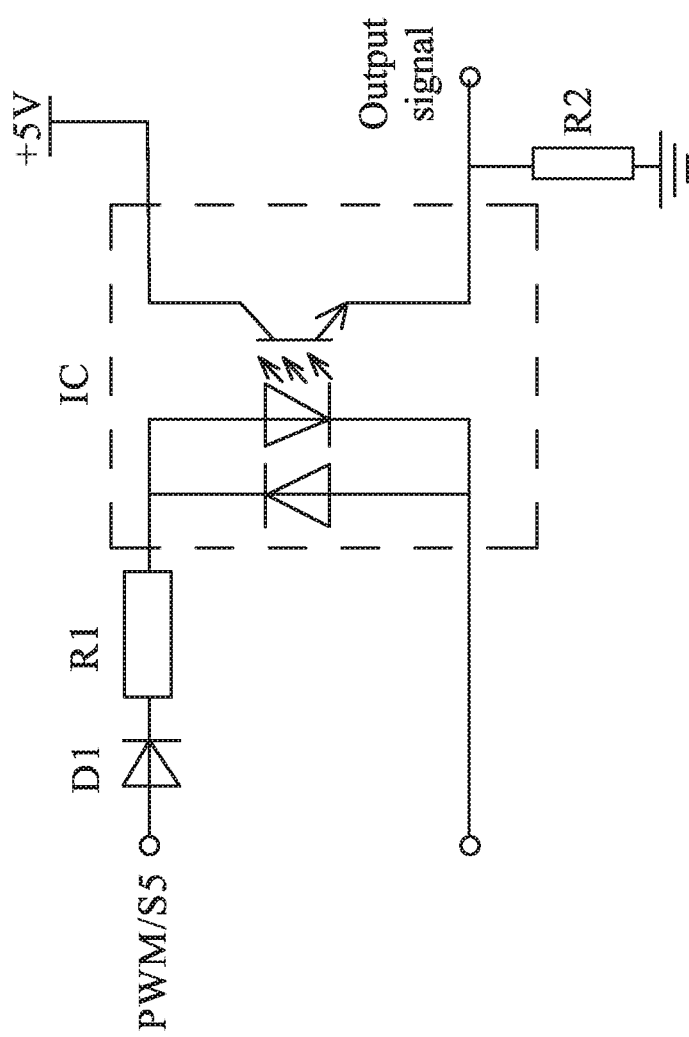
FIG. 5 is a circuit diagram of an isolation circuit according to one embodiment of the disclosure.

As shown in FIGS. 4-5, a motor controller for ECMs comprises: a microprocessor; an inverter circuit; a rotation speed detection circuit; a power module; and an isolation circuit. The components are disposed on the control circuit board. The power module comprises an ECM filter, a rectifier filter, and a DC-DC converter. The input end of the ECM filter is connected to the AC input. The output end of the ECM filter is connected to the input end of the rectifier filter. The rectifier filter outputs a bus voltage and is connected to the DC-DC converter. The DC-DC converter outputs +15 V, +5 V alternately. The bus voltage, +15 V, and +5 V supplies the circuits. The Hall element detects the motor rotor position signal and transmits the signal to the microprocessor, and the microprocessor controls the operation of the motor via the inverter circuit.

The motor controller communicates with five rotation speed input signals S1, S2, S3, S4, and S5, and one PWM signal for motor speed regulation. The PWM signal is transmitted to the isolation circuit and the microprocessor successively via the PWM input line P0. The microprocessor comprises a signal identification unit. One rotation speed input signal S5 of a motor is transmitted to the signal identification unit of the microprocessor via the isolation circuit and the PWM input line P0. The signal identification unit determines whether an input signal of the PWM input line is a PWM signal or the one rotation speed input signal S5 of the motor. The rotation speed input signals S1, S2, S3, S4, and S5 of the motor are a 24 VAC signal, a 115 VAC signal, or a 230 VAC signal. The PWM input line P0 is connected to a multiplexing I/O port of a timer of the microprocessor. The remaining rotation speed input signals S1, S2, S3, and S4 of the motor are input via corresponding rotation speed input lines N1, N2, N3, and N4. The rotation speed detection circuit comprises a plurality of detection units 21, 22, 23, 24 which are independent from one another. The detection units 21, 22, 23, 24 are connected to the rotation speed input lines N1, N2, N3, N4, respectively. The rotation speed detection circuit transmits the rotation speed input signals S1, S2, S3, and S4 to a common I/O port of the microprocessor. The microprocessor selects an operating parameter of the motor according to the rotation speed input signals S1, S2, S3, S4 from the rotation speed input lines and the one rotation speed input signal S5 from the PWM input line P0, and controls the motor to run according to the selected operating parameter.

The signal identification unit can be a hardware unit, for example, a spectrum identifier; when a frequency of an input signal of the PWM input line P0 is 50 Hz or 60 Hz, determine the signal is a rotation speed input signal of a motor; and when a frequency of an input signal of the PWM input line P0 is unequal to 50 Hz or 60 Hz, determine the signal is a PWM signal, which is used for motor speed regulation. The frequency of common electric supply or 24 VAC is 50 Hz or 60 Hz, the spectrum identifier can identify the frequency, and outputs a signal to the microprocessor.

The signal identification unit can also be a software unit (which is achieved by a program module in the microprocessor); when a frequency of an input signal of the PWM signal input line is 50 Hz or 60 Hz, determine the signal is a rotation speed input signal of a motor; and when a frequency of an input signal of the PWM signal input line is unequal to 50 Hz or 60 Hz, determine the signal is a PWM signal.

As shown in FIG. 5, the isolation circuit is an optocoupler isolation circuit, comprises a first resistor R1, a second resistor R2, a diode D1 and an optocoupler IC. When a 24 VAV rotation speed signal S5 is input, the optocoupler isolation circuit outputs a square wave signal having a frequency of 50 Hz or 60 Hz, the microprocessor can read the signal through the multiplexed I/O port of the timer, and then the software program module determines the signal.

Example 2

An electronically commutated motor (ECM) comprises the motor controller disclosed in Example 1 and a motor body. The motor body comprises a rotor assembly, a stator assembly, and a housing assembly.

Unless otherwise indicated, the numerical ranges involved in the invention include the end values. While particular embodiments of the invention have been shown and described, it will be obvious to those skilled in the art that changes and modifications may be made without departing from the invention in its broader aspects, and therefore, the aim in the appended claims is to cover all such changes and modifications as fall within the true spirit and scope of the invention.

The invention claimed is:

1. A motor controller, comprising:
    a microprocessor comprising a signal identification unit;
    an inverter circuit;
    a rotation-speed detection circuit;
    a power module; and
    an isolation circuit;
wherein:
    the power module is adapted to supply power for the microprocessor, the inverter circuit, the rotation-speed detection circuit, and the isolation circuit;
    the rotation-speed detection circuit is adapted to receive a plurality of rotation-speed input signals and transmit the plurality of rotation-speed input signals to the microprocessor;
    the isolation circuit is connected to the microprocessor via a pulse width modulation (PWM) input line, and the isolation circuit is adapted to receive a PWM-line input signal and transmit the PWM-line input signal to the microprocessor via the PWM input line, wherein the PWM-line input signal is a PWM signal or one rotation-speed input signal;

the signal identification unit is adapted to receive the PWM-line input signal and determine whether the PWM-line input signal is the PWM signal or the one rotation-speed input signal; and the microprocessor is adapted to select operating parameters of a motor based on the plurality of rotation-speed input signals and the one rotation-speed input signal; and the microprocessor is adapted to regulate a speed of the motor based on the PWM signal.

2. The controller of claim 1, wherein the one rotation-speed input signal of the motor is a 24 VAC signal, a 115 VAC signal, or a 230 VAC signal.

3. The controller of claim 2, wherein the PWM input line is connected to a multiplexing I/O port of a timer of the microprocessor.

4. The controller of claim 3, wherein:
the plurality of rotation-speed input signals is input via a plurality of rotation-speed input lines; lines, respectively;
the plurality of rotation-speed input lines is connected to the rotation-speed detection circuit;
the rotation-speed detection circuit is adapted to transmit the plurality of rotation-speed input signals via a common I/O port of the microprocessor; and
the microprocessor is adapted to control the motor to run according to the selected operating parameters.

5. The controller of claim 3, wherein the isolation circuit is an optocoupler isolation circuit.

6. The controller of claim 1, wherein the PWM input line is connected to a multiplexing I/O port of a timer of the microprocessor.

7. The controller of claim 6, wherein:
the plurality of rotation-speed input signals is input via a plurality of rotation-speed input lines, respectively;
the plurality of rotation-speed input lines is connected to the rotation-speed detection circuit;
the rotation-speed detection circuit is adapted to transmit the plurality of rotation-speed input signals via a common I/O port of the microprocessor; and
the microprocessor is adapted to control the motor to run according to the selected operating parameters.

8. The controller of claim 6, wherein the isolation circuit is an optocoupler isolation circuit.

9. An electronically commutated motor (ECM), comprising a motor controller of claim 1 and a motor body, the motor body comprising a rotor assembly, a stator assembly, and a housing assembly.

10. A motor controller, comprising:
a microprocessor comprising a signal identification unit;
an inverter circuit;
a rotation-speed detection circuit;
a power module; and
an isolation circuit;
wherein:
the power module is adapted to supply power for the microprocessor, the inverter circuit, the rotation-speed detection circuit, and the isolation circuit;
the rotation-speed detection circuit is adapted to receive a plurality of rotation-speed input signals and transmit the plurality of rotation-speed input signals to the microprocessor;
the isolation circuit is connected to the microprocessor via a pulse width modulation (PWM) input line, and the isolation circuit is adapted to receive a PWM-line input signal and transmit the PWM-line input signal to the microprocessor via the PWM input line, wherein the PWM-line input signal is a PWM signal or one rotation-speed input signal;

the signal identification unit is adapted to receive the PWM-line input signal and determine whether the PWM-line input signal is the PWM signal or the one rotation-speed input signal;

the microprocessor is adapted to select operating parameters of a motor based on the plurality of rotation-speed input signals and the one rotation-speed input signal; and the microprocessor is adapted to regulate a speed of the motor based on the PWM signal;

the PWM input line is connected to a multiplexing I/O port of a timer of the microprocessor;

the signal identification unit is a hardware unit;

when a frequency of the PWM-line input signal is 50 Hz or 60 Hz, the signal identification unit determines that the PWM-line input signal is the one rotation-speed input signal; and when the frequency of the PWM-line input signal is unequal to 50 Hz or 60 Hz, the signal identification unit determines that the PWM-line input signal is the PWM signal.

11. The controller of claim 10, wherein the hardware unit employs a spectrum identifier.

12. A motor controller, comprising:
a microprocessor comprising a signal identification unit;
an inverter circuit;
a rotation-speed detection circuit;
a power module; and
an isolation circuit;
wherein:
the power module is adapted to supply power for the microprocessor, the inverter circuit, the rotation-speed detection circuit, and the isolation circuit;
the rotation-speed detection circuit is adapted to receive a plurality of rotation-speed input signals and transmit the plurality of rotation-speed input signals to the microprocessor;
the isolation circuit is connected to the microprocessor via a pulse width modulation (PWM) input line, and the isolation circuit is adapted to receive a PWM-line input signal and transmit the PWM-line input signal to the microprocessor via the PWM input line, wherein the PWM-line input signal is a PWM signal or one rotation-speed input signal;

the signal identification unit is adapted to receive the PWM-line input signal and determine whether the PWM-line input signal is the PWM signal or the one rotation-speed input signal;

the microprocessor is adapted to select operating parameters of a motor based on the plurality of rotation-speed input signals and the one rotation-speed input signal; and the microprocessor is adapted to regulate a speed of the motor based on the PWM signal;

the one rotation-speed input signal of the motor is a 24 VAC signal, a 115 VAC signal, or a 230 VAC signal;

the PWM input line is connected to a multiplexing I/O port of a timer of the microprocessor;

the signal identification unit is a hardware unit;

when a frequency of the PWM-line input signal is 50 Hz or 60 Hz, the signal identification unit determines that the PWM-line input signal is the one rotation-speed input signal; and when the frequency of the PWM-line input signal is unequal to 50 Hz or 60 Hz, the signal identification unit determines that the PWM-line input signal is the PWM signal.

13. The controller of claim 12, wherein the hardware unit employs a spectrum identifier.

* * * * *